C. FORSCHNER.
Sausage-Stuffing Machines.
No. 151,280.                      Patented May 26, 1874.
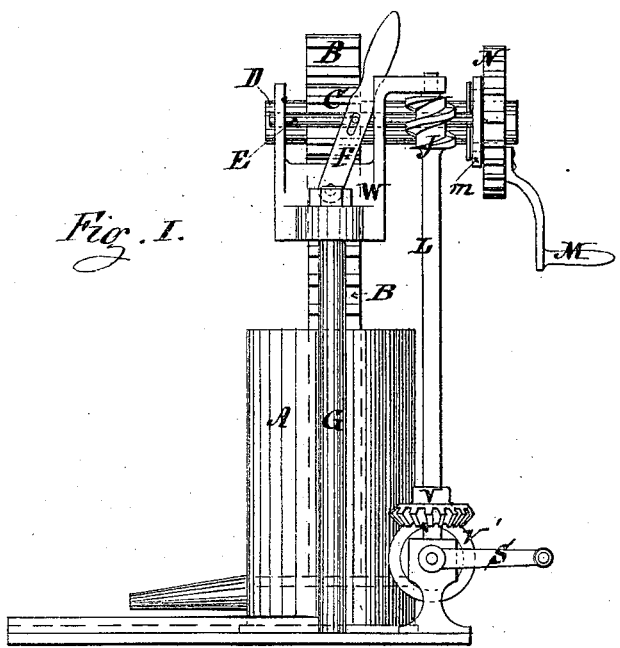
Fig. I.
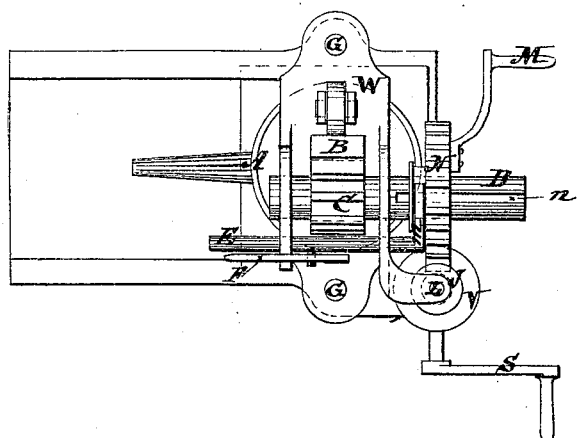
Fig. II.
Witnesses.
A. E. Collins
C. Wruten
Inventor.
Charles Forschner
per Henry E. Roeder
Attorney.

UNITED STATES PATENT OFFICE.

CHARLES FORSCHNER, OF NEW YORK, N. Y.

IMPROVEMENT IN SAUSAGE-STUFFING MACHINES.

Specification forming part of Letters Patent No. 151,280, dated May 26, 1874; application filed March 30, 1874.

*To all whom it may concern:*

Be it known that I, CHARLES FORSCHNER, of New York, in the State of New York, have invented a new and Improved Sausage-Stuffer, of which the following is a specification:

The nature of my invention consists in the arrangement of the gearing which works the piston in such a manner that said piston will be forced downward by a slow motion, and will be moved upward and withdrawn from the cylinder by a quick motion.

In the accompanying drawing, Figure I represents a side elevation, and Fig. II a top view, of a sausage-stuffer embodying my invention.

B is a rack attached to the piston, fitted into the cylinder A, and guided in a suitable frame, W, supported through the rods G above the cylinder A. In this frame W a shaft, D, is supported, turning in suitable bearings, and provided with a pinion, C, working into the rack B. The shaft D is made to project on one side of the frame, and has a gear-wheel, N, fitted to it, capable of moving backward and forward on the key $n$, securely fastened to said shaft. In the hub of this wheel N a fork, $m$, attached to a bar, E, is made to work in a suitable groove. The bar E slides in bearings on the frame W, and is connected to a lever, F, through which this bar E, and consequently the wheel N, may be moved inward or outward, as may be desired. A crank-handle, M, is securely fastened to said wheel N for the purpose of turning the same, and consequently the shaft D and pinion C, operating thereby the rack B and piston. L is an upright shaft, supported on the bed-plate of the machine, and in a suitable projection on the frame W, and provided on its upper end with a worm-wheel, J, working into the gear-wheel N, when the latter is moved inward in line with said worm-wheel. On the lower end of the shaft L a bevel-wheel, V, is attached, meshing into a corresponding bevel-wheel, V', fast on a horizontal shaft provided with a crank-handle, S, to operate the same.

When the piston is to be raised and moved out of the cylinder A, the wheel N is moved away from the worm J, as shown in Fig. I, when the shaft D can be turned through the handle M with a quick motion, and consequently the rack B, with its piston, is drawn upward in a speedy manner. When the piston is to be pressed into the cylinder A to force out the sausage-meat, the wheel N is moved in a line with the worm-wheel J by means of the lever F operating the rod E, which, as above described, is connected, through its fork $m$, with the wheel N, as shown in Fig. II. The crank S is then turned, whereby, through the gearing-wheels V' V, the shaft L and worm J are turned, acting upon the wheel N, so as to turn the shaft D and pinion C, operating thereby the rack B and its piston, to force the same downward with the proper slow motion.

What I claim as my invention, and desire to secure by Letters Patent, is—

The combination of the bevel-wheels V' V, operated by the crank S, the upright shaft L with worm J, the wheel N with its rod E and lever F, the shaft D, and pinion C, with the rack B attached to the piston, all constructed and arranged substantially in the manner and for the purpose herein set forth.

CHAS. FORSCHNER.

Witnesses:
 HENRY E. ROEDER,
 A. E. COLLINS.